(12) United States Patent
Goss et al.

(10) Patent No.: US 9,489,148 B2
(45) Date of Patent: Nov. 8, 2016

(54) SELECTING BETWEEN NON-VOLATILE MEMORY UNITS HAVING DIFFERENT MINIMUM ADDRESSABLE DATA UNIT SIZES

(71) Applicant: Seagate Technology LLC, Cupertino, CA (US)

(72) Inventors: Ryan James Goss, Prior Lake, MN (US); Jon D. Trantham, Chanhassen, MN (US); Antoine Khoueir, Apple Valley, MN (US); David Scott Ebsen, Minnetonka, MN (US); Mark Allen Gaertner, Vadnais Heights, MN (US); Kevin Gomez, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 366 days.

(21) Appl. No.: 13/802,192

(22) Filed: Mar. 13, 2013

(65) Prior Publication Data
US 2014/0281280 A1 Sep. 18, 2014

(51) Int. Cl.
*G06F 3/06* (2006.01)

(52) U.S. Cl.
CPC .............. *G06F 3/067* (2013.01); *G06F 3/061* (2013.01); *G06F 3/0631* (2013.01); *G06F 3/0643* (2013.01); *G06F 3/0688* (2013.01); *G06F 2212/7202* (2013.01); *G06F 2212/7208* (2013.01)

(58) Field of Classification Search
CPC .... G06F 3/061; G06F 3/0646; G06F 3/0688; G06F 3/0643
See application file for complete search history.

(56) References Cited

U.S. PATENT DOCUMENTS

| | | |
|---|---|---|
| 7,676,626 B2 | 3/2010 | Lee et al. |
| 7,962,685 B2 | 6/2011 | Cheung et al. |
| 8,060,719 B2 | 11/2011 | Radke et al. |
| 8,078,794 B2 | 12/2011 | Lee et al. |
| 2005/0068802 A1 | 3/2005 | Tanaka |
| 2008/0077728 A1 | 3/2008 | Kim et al. |
| 2008/0104309 A1 | 5/2008 | Cheon et al. |
| 2009/0204746 A1 | 8/2009 | Chen et al. |
| 2010/0218064 A1 | 8/2010 | Ito |
| 2011/0107042 A1 | 5/2011 | Herron |
| 2011/0167197 A1 | 7/2011 | Leinwander |

(Continued)

FOREIGN PATENT DOCUMENTS

WO    WO2009102425    8/2009

OTHER PUBLICATIONS

"Will RRAM Replace Flash?", Network Computing, Aug. 21, 2013.*

(Continued)

*Primary Examiner* — Edward Dudek, Jr.
(74) *Attorney, Agent, or Firm* — Hollingsworth Davis, LLC (57) ABSTRACT

An apparatus includes a controller capable of being coupled to a host interface and a memory device. The memory device includes two or more non-hierarchical, non-volatile memory units having different minimum addressable data unit sizes. The controller is configured to at least perform determining a workload indicator of a data object being stored in the memory device via the host interface. The controller selects one of the memory units in response to the workload indicator of the data object corresponding to the minimum addressable data unit size of the selected memory unit corresponding to the workload indicator. The data object is stored in the selected memory unit in response thereto.

20 Claims, 4 Drawing Sheets

(56) References Cited

U.S. PATENT DOCUMENTS

| | | |
|---|---|---|
| 2012/0072801 A1 | 3/2012 | Takeuchi et al. |
| 2012/0246391 A1 | 9/2012 | Meir et al. |
| 2012/0271985 A1 | 10/2012 | Jeong et al. |
| 2012/0297121 A1* | 11/2012 | Gorobets et al. ............ 711/103 |
| 2013/0021846 A1* | 1/2013 | Rao .......................... 365/185.03 |

OTHER PUBLICATIONS

Office Action dated Feb. 12, 2015 from Korean Application No. 10-2014-0023447, 8 pages.

Jun. 30, 2016, Office Action dated Jun. 30, 2016 from Chinese Application No. 201410090113.5, 7 pages.

* cited by examiner

SELECTING BETWEEN NON-VOLATILE MEMORY UNITS HAVING DIFFERENT MINIMUM ADDRESSABLE DATA UNIT SIZES

SUMMARY

The present disclosure is related to selecting between non-volatile memory units having different minimum addressable data unit sizes. In one embodiment, an apparatus includes a controller capable of being coupled to a host interface and a memory device. The memory device includes two or more non-hierarchical, non-volatile memory units having different minimum addressable data unit sizes. The controller is configured to at least perform determining a workload indicator of a data object being stored in the memory device via the host interface. The controller selects one of the memory units in response to the workload indicator of the data object corresponding to the minimum addressable data unit size of the selected memory unit corresponding to the workload indicator. The data object is stored in the selected memory unit in response thereto.

In another embodiment, a system includes two or more non-hierarchical, non-volatile memory units having different minimum addressable data unit sizes. The system includes means for determining a workload indicator of a data object that is a subject of a host command. The system further includes means for selecting a memory unit of the two or more memory units. The selection occurs in response to the workload indicator of the data object corresponding to the minimum addressable data unit size of the selected memory unit corresponding to the workload indicator. The system further includes means for storing the data object in the selected memory unit in response thereto.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to memory systems that include a number of different types of memory. Each type of memory has physical characteristics and storage architecture. The memory types can comprise, for example, flash memory, rotating magnetic memory (e.g. as in a hard disk drive), etc. and newer solid-state memory technologies including phase-change memory (PCM), resistive random-access memory (RRAM), spin-torque RAM (STRAM), magnetic RAM (MRAM), and/or non-volatile SRAM (NVRAM). While each of these memory types may have different characteristics and advantages, effective use of memory devices using the different memory types may involve effectively managing physical changes in the media in response to aging of the media, latency of the media, endurance of the media, space available on the media, and/or based on workload of the media.

Data objects (e.g. computer files) can be associated with certain storage memory characteristics based upon the observed usage of the object, for example object access patterns. Memory characteristics can encompass factors such as the memory size, write latency, read latency, power consumption, retention time, reliability, a minimum addressable data unit size, and/or other characteristics. The data objects may also have storage specific aspects that include, for example, frequency of access, frequency of writes, sequentiality of access, reliability, and/or long retention times.

Aligning the storage specific aspects of the data objects with memory characteristics may increase efficiency of both the memory component and the overall data storage device. For example, data that are written frequently may be stored in a high endurance memory. Some data objects benefit more than other data objects when paired with a memory type with fast access times such as a low latency memory type. Efficient utilization may be accomplished if the storage characteristics to be stored in a memory system matches the type of memory in which the data is stored. According to various implementations, aligning the storage specific needs with memory characteristics may involve determining workload attributes.

Figure 1:
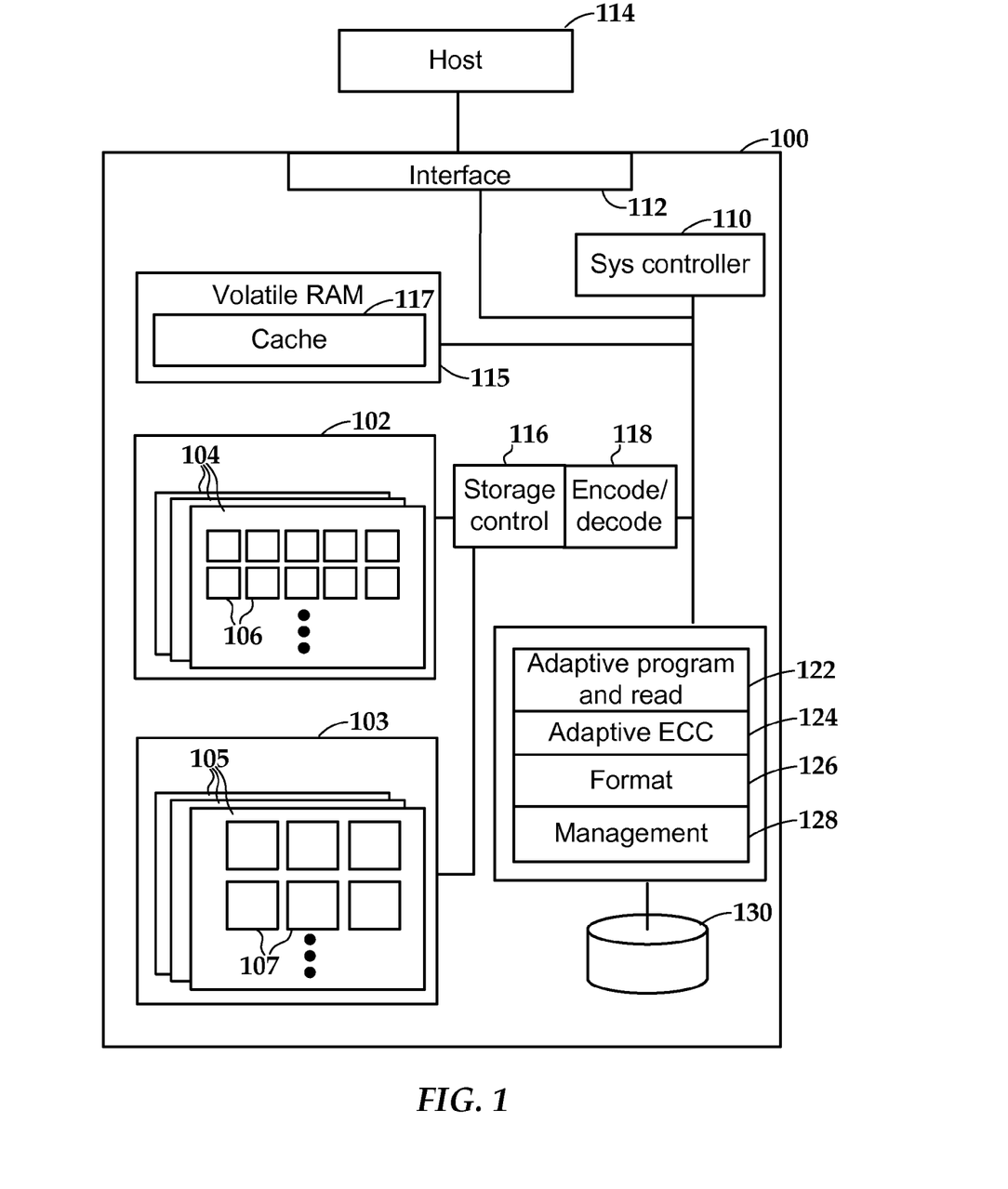
FIG. 1 is a block diagram of a data storage device according to various aspects.

In FIG. 1, a block diagram illustrates a data storage device 100 according to embodiments described herein. This device 100 may be configured as a solid-state drive (SSD) (or sub-component thereof) that utilizes any combination of solid state memory. The features of the device 100 may be applicable to other types of data storage devices, such as hybrid hard disk drives that use a combination of solid state memory and magnetic disks. The features of the device 100 may also be applicable to special-purpose solid-state and/or disk data storage devices (or sub-components thereof) that do not utilize standard hard drive data interfaces.

The device 100 may include one or more memory units 102, 103 that contain some or all of the non-volatile memory of the device 100. The memory units 102, 103 may include one or more respective discrete physical units 104, 105 e.g., memory die or chips, partitions thereof (e.g. planes), or agglomerations thereof (e.g. multiple packages, multi-chip packages), etc. In this example, the memory units 102, 103 are non-hierarchical units, and the respective physical units 104, 105 each contain a different type of non-volatile memory storage media from the other.

Within each of the physical units 104, 105, the memory may be grouped into smaller blocks 106, 107. Because the underlying media of the physical units 104, 105 are different, the memory sizes of the blocks 106, 107 may differ. Many other characteristics, such as addressability and performance may differ. While some of the features of the device 100 are applicable to non-hierarchical mixed-media storage, most of the concepts described below may be employed in devices using a single memory unit and a single storage media type.

In embodiments in which the memory units 104, 105 are non-hierarchical, the memory units may have addressable bit characteristic and at least one other different characteristic that includes any combination of throughput metric, latency metric, endurance metric, and space available metric. A memory unit 104 105 is selected in response to a composite characteristic corresponding to the workload indicator. In some cases a selected characteristic of the at least one other characteristic has a higher priority when a memory unit 104, 105 related to the selected characteristic reaches a threshold value. The selected characteristic comprises an endurance metric, and/or a space available metric, for example.

The device 100 may include one or more system controllers 110 that facilitate servicing requests received from a host 114 via a host interface 112. The host interface may provide access to logical blocks of a uniform logical block size. In some cases, the minimum addressable data unit size is smaller than the host's uniform logical block size. The controller 110 may generally receive read or write requests from the host 114 referencing logical addresses. Among other things, the system controller 110 translates the logical addresses to physical addresses, and directs respective read or write operations to be performed on the appropriate physical addresses of the memory units 102, 103.

The device 100 may include volatile random access memory 115 (RAM) that may be used for, among other things, a volatile cache 117 for the non-volatile memory units 102, 103. Generally, the volatile cache 117 is a hierarchical memory structure that mirrors portions of the non-volatile memory 102, 103, but can be read from and/or written to more quickly than the non-volatile memory 102, 103. For some situations, e.g., data that sees repeated read/write activity over a short period of time, the volatile cache 117 will increase performance.

The system controller 110 is coupled to one or more storage controllers 116 that determines and changes states of the media of memory units 102, 103. The storage controller 116 may include logic circuits (e.g., gate arrays, multiplexers, etc.) that allow particular memory cells to be selected for reading or writing. The storage controller may include circuitry facilitating error correcting code ECC and/or error detecting code EDC logic.

The storage controller 116 may also include analog signal processing circuits (e.g., filters, amplifiers) that provide signals used for reading and writing the cells, as well as digital to analog converters (DACs) and analog to digital converters (ADC) used to translate between the analog information stored in the memory media and the digital information utilized elsewhere in the device, or these sorts of analog circuits may be present in the memory devices and the information may be communicated back to the storage controller, for example to accomplish low-density parity code ECC functions. The storage controller 116 may be configured to select a memory unit 102, 103 in response to a workload indicator of a data object.

An encoder/decoder module 118 operates with the storage controller 116 to translate between digital coding formats used by the memory units 102, 103 and user data formats. The encoder/decoder module 118 may be part of the storage controller 116 or a separate unit. If multiple memory units 102, 103 are used, the device 100 may include multiple storage controllers 116 and encoder/decoders 118 that at least performing their respective operations in a way customized for the particular memory types. The separate controllers may also utilize their own logical-to-physical mapping appropriate to the particular memory architecture. In such a case, the system/primary controller 110 may transform a logical host address to an internal logical address usable by the memory units 102, 103.

The primary controller 110 (as well as the storage controller 116 and encoder decoder 118) may operate in response to instructions from memory, logic circuits, firmware or software, represented here as computer-readable media 120 that stores instructions operable by the device 100 to perform operations as described hereinbelow. For example, an adaptive program/read module 122 may alter parameters used by the storage controller 116 when reading or writing to memory units 102, 103. An adaptive ECC module 124 may operate with the encoder/decoder 118 to modify ECC parameters as discussed below.

The computer-readable media 120 also includes a formatting module 126 that may dictate various aspects related to how data is stored within memory units 102, 103. Some aspects of the formatting module 126 may be included within the storage controller 116, such as interleaving of data within particular memory structures. Other aspects of the formatting module 126, such as choosing between different memory units 102, 103 for storing particular data, may be implemented at a higher level, e.g., logical to physical mapping. A management module 128 may also operate at a high-level, e.g., tracking host activity, initiating background processes, etc. The device 100 may include a database 130 that includes a reserved portion of non-volatile memory for data such as usage metrics, configuration settings, etc.

Generally, one or more of the management module 128, system controller 110, host interface 112, and database 130 may collectively act as means for determining a workload indicator of a data object that is a subject of a host command. Similarly, one or more of the formatting module 126, management module 128, system controller 110, storage controller 116, and database 130 may collectively act as means for selecting a memory unit of the two or more memory units 102, 103 in response to the workload indicator of the data object corresponding to the minimum addressable data unit size of the selected memory unit corresponding to the workload indicator. One or more of the formatting module 126, management module 128, system controller 110, storage controller 116 may collectively act as means for storing the data object in the selected memory unit in response thereto.

As previously noted, memory units 102, 103 may contain a different types of memory storage media. For example, the memory units 102, 103 may each include different respective media such as flash memory, HDD, PCM, RRAM, STRAM, MRAM, and/or NVRAM. In some cases, there may be more than two memory units.

In some cases, the different sets of memory can also communicate their overall utilization and/or effectiveness to each other or to a centralized system. This communication can then be used to determine if some memory type is being under or over utilized. This communication may be taken into consideration when selecting a memory type to store a data object. In some cases the communicated data is given a higher priority than workload indicators of the data type.

Figure 2:
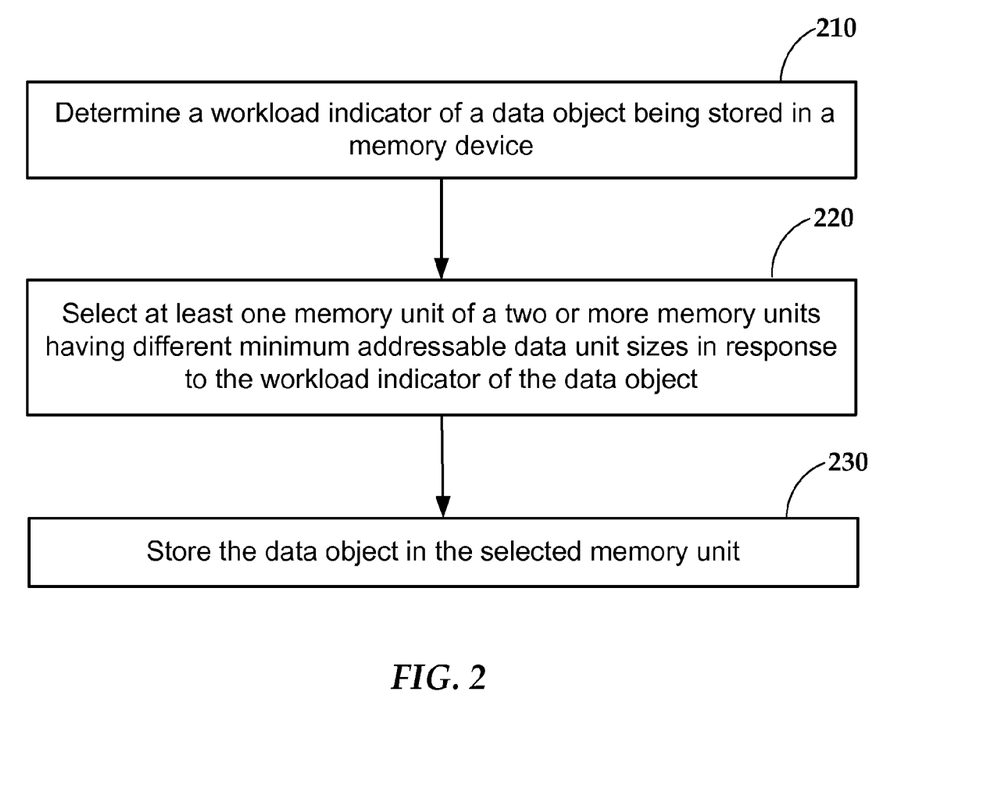
FIG. 2 depicts a process for storing data to a memory unit in accordance with embodiments described herein.

FIG. 2 depicts a process for storing data to a memory unit in accordance with embodiments described herein. A workload indicator of a data object being stored in a memory device is determined 210. The workload indicator may include a level and/or frequency of recent activity related to the data object. In such a case, objects having relatively higher levels and/or frequency of recent activity may correspond to the memory units having relatively smaller minimum addressable data unit sizes. The workload indicator may include a randomness measure of the data object. In such a case objects having relatively higher randomness correspond to the memory units having relatively smaller minimum addressable data unit sizes. The workload indicator may optionally include a temporal locality metric.

At least one memory unit of two or more memory units having different minimum addressable data unit sizes is selected 220 in response to the workload indicator of the data object. The memory units may be non-hierarchical units that have at least one other different characteristic that includes any combination of throughput metric, latency metric, endurance metric, and space available metric. In such a case, the selected one of the memory units may be selected in response to a composite characteristic corresponding to the workload indicator, the composite characteristic being based on the different minimum addressable data unit sizes and the at least one other different characteristic. Further in such a case, a selected characteristic of the at least one other characteristic dominates the composite characteristic when a state of at least one of the memory units related to the selected characteristic reaches a threshold value. The selected characteristic in that case may include one or more of the endurance metric and the space available metric. According to various implementations, at least one of the memory units may be addressable at an individual bit level. The data object is stored 230 in the selected memory unit.

As described previously, a data object may be assigned a memory type based on various aspects of the data type and characteristics of the memory type. The characteristics of the memory type include at least historical or predicted workload, throughput or latency of the memory, endurance of the memory, actual or predicted wear on the memory, space available on the memory. The space available on the memory may be a function of a percentage of space in the memory type or unit and/or a percentage of space available in the memory device. In some cases, a data object is assigned to a memory type that takes into consideration more than one media type characteristic and/or workload indicator. For example, a data object may be assigned a memory type based on the access speed and the addressable data unit size of the memory type.

The workload indicator of the memory type may be based on various factors. For example, the workload may be based on a randomness measure of a data object, the level and/or frequency of recent activity related to the data object, the size of the data object, whether the data is hot or cold, and/or the location of the data object. In some cases, the workload indicator comprises a level and/or frequency of recent activity related to the data object. Data objects having relatively higher levels and/or frequency of recent activity may correspond to the memory units having relatively smaller minimum addressable data unit sizes.

Data objects having relatively higher levels and/or frequency of recent activity correspond to the memory units having relatively smaller minimum addressable data unit sizes. These workload attributes can then be used to align the data with compatible memory type. In some cases, the workload can be determined by monitoring incoming write data and measuring the subsequent reads. Storage specific attributes can take into account factors such as data write frequency and read frequency.

According to various embodiments, workload indicators can be determined by monitoring temporally associated commands for temporal and spatial locality. Temporal locality involves information that is referenced or accessed at one point in time which will be referenced again in the near future. Spatial locality involves information that is nearby information that was recently accessed. In some cases the data object is combined with at least one other data object. The grouping may be based on workload attributes. In some cases, the grouping is based on data objects that have a common temporal and/or locality.

Figure 3A:
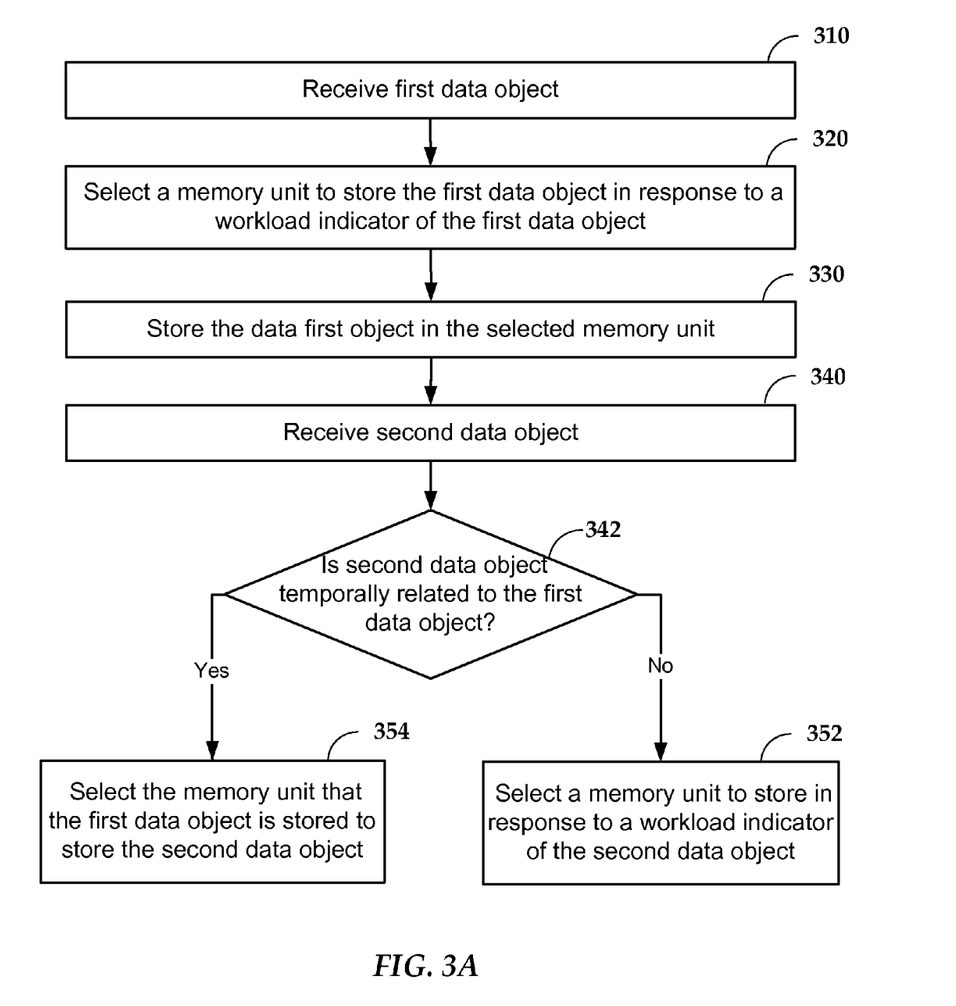
FIG. 3A illustrates a method for selecting a memory unit based on temporal and spatial locality.

According to various implementations, data objects having particular characteristics are paired or grouped and stored in a memory type that has compatible characteristics. FIG. 3A illustrates a method for selecting a non-hierarchical, non-volatile memory unit based on temporal and spatial locality in accordance with embodiments described herein. A first data object is received 310 via a host command. A memory unit is selected 320 to store the first data object in response to a workload indicator of the first data object. The first data object is stored 330 in the selected memory unit.

A second data object is received 340 via a host command. It is determined 342 whether the second data object is temporally related to the first data object. This determination 342 may also involve comparing spatial locality with the first data object. If it is determined 342 that the second data object is temporally (and possibly spatially) related to the first data object, the memory unit that the first data object is stored is selected 354 to store the second data object. If it is determined 342 that the second data object is not temporally related to the first data object, a memory unit is selected 352 to store the second data object in response to a workload indicator of the second data object. In this case, the memory unit that is selected to store the second data object may be the same memory unit and/or a different memory unit that the first data object is stored.

Figure 3B:
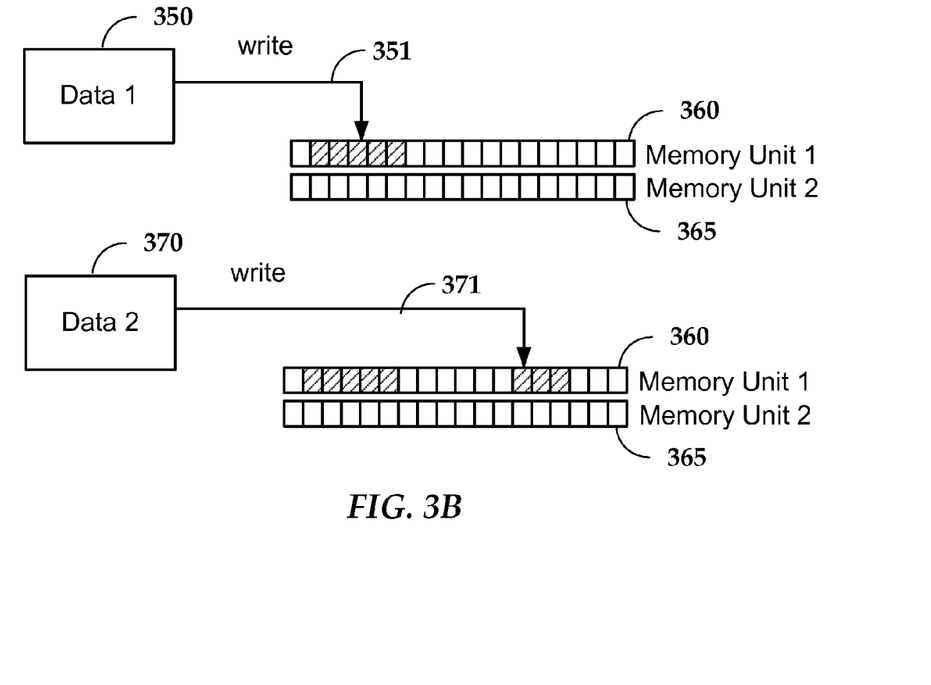
FIG. 3B illustrates an example that includes two data objects with a related temporal locality.

FIG. 3B illustrates an example that includes two data objects 350, 370 with a related temporal locality and two memory units 360, 365. According to FIG. 3B, a first data object 350 is received via host command 351 and is written to a first memory unit 360. A second data object 370 is received via host command 371 and is determined to be temporally related to the first data object 350. This determination may involve comparing a time between host commands 351, 371, looking up a database of recently processed commands, etc.

As a result of the temporal affinity, the second data object 370 is written to same memory unit to which the first data object 350 is stored. In this example, the first data object 350 is stored in the first memory unit 360 so the second data object 370 is also stored in the first memory unit 360. Storing data with related temporal locality may cause the data to also have a related spatial locality. This may allow the data to be later read back sequentially and increase throughput of the memory device.

The spatial locality of the data objects 350, 370 may also be determined based on logical block addresses of the objects 350, 370, which would be provided in the host commands 351, 371. This is may provide an indication that the data objects 350, 370 should be written to the same memory unit 360. This determination may be made separately from temporal locality. However, random data may have spatial locality without strong temporal affinity, in which case there may not be a large advantage in physically storing the data to be read back sequentially. However, random data may be targeted for particular ones of the memory units 360, 365 based on one of the units having characteristics that are more suitable for random data.

As noted previously, some workload indicators have a higher priority than other workload indicators when selecting a memory unit. Spatial locality may have a higher priority than other workload indicators such as power consumption, for example. Other characteristics of the memory units may adjust this prioritization. For example, if a memory unit is becoming fuller than the other, then the priorities may be adjusted to fill out the less full unit, even if this means reduction in some other performance metric.

Figure 4:
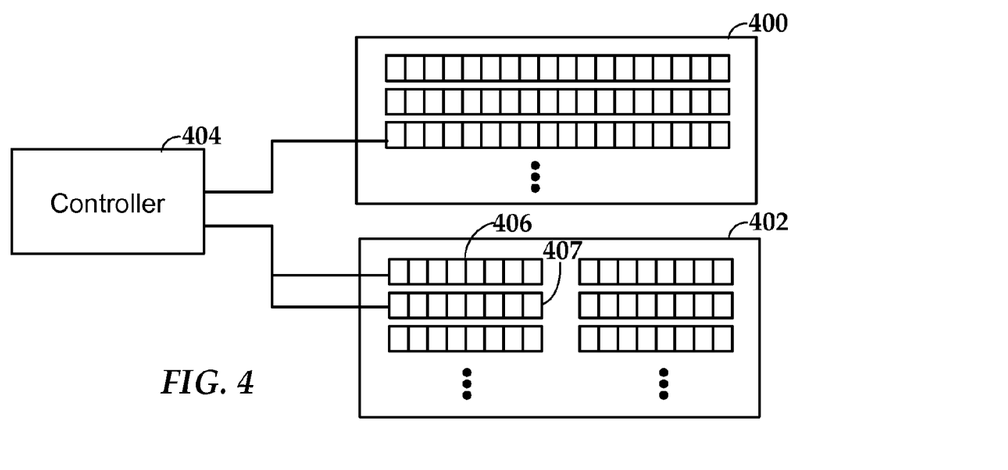
FIG. 4 shows a memory device that includes regions having different types or configuration of memory.

As previously described in relation to FIG. 1, a memory device may include regions having different types or configuration of memory. One example of this is shown in FIG. 4, where memory units 400, 402 may be written to and read from by a controller 404 (e.g., using formatting module 126 shown in FIG. 1). Memory units 400, 402 may be of a different or same memory type, however have different storage unit sizes, e.g., physical block or page sizes. In this example, memory unit 402 has a minimum page size of N, and memory unit 400 has a minimum page size of 2N. If the minimum logical block size also corresponds to 2N, then one page of memory unit 400 may store a logical block, and two pages of memory unit 402 are used to store one logical block.

The controller 404 may select one of units 400 and 402 for storage of data depending on how the data may be used. For example, if data is expected to be randomly updated, then it may be more efficient to store the data in the unit 402 with smaller page sizes. So if a logical block of data is determined to be random, it can be stored in blocks 406, 407 of memory unit 402. If it can be determined (e.g., via an existing entry in a volatile cache) that only part of a page has been changed by a host command, then it may be that only one of blocks 406, 407 needs to be rewritten. Such a selection may depend on other factors, such as relative latency and throughput of units 400, 402, whether pages in unit 402 can be written in parallel, relative power consumption required to program pages of units 400, 402, etc.

The controller 404 may also utilize other system data to dictate where data is stored in one or both memory units 400, 402. For example, the controller may be able to track both wear within the units 400, 402, as well as workload metrics such as whether data is hot or cold. In such a case, the most worn blocks of memory units 400, 402 may be selected to get the coldest data. In some embodiments, the controller 404 determines where data is stored based on minimum addressable data unit size of the memory units 400,402. For example, the controller may select memory unit 400 to store particular data if memory unit 400 is addressable at an individual bit level. Additionally or alternatively, the controller may select a memory unit based on other factors.

The controller 404 may also periodically reallocate bad units (for example word lines) and retire bad units. For example, if two physical pages are insufficiently reliable to store the advertised page size, their advertised capacity may be halved and they could be combined into a single logical unit with a greatly increased ECC code. This may also involve re-characterizing metrics such as reliability or retention.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing caching in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
 a controller capable of being coupled to a host interface and a memory device comprising two or more non-hierarchical, non-volatile memory units having a composite characteristic based on different minimum addressable data unit sizes and an endurance metric, the two or more memory units comprising a first unit of flash memory and a second unit of non-flash memory, the controller configured to at least perform:
   determining a workload indicator of a data object being stored in the memory device via the host interface;
   select one of the memory units in response to the workload indicator of the data object corresponding the composite characteristic of the selected memory unit corresponding to the workload indicator, wherein the endurance metric dominates the composite characteristic when an endurance of at least one of the two or memory units reaches a threshold value; and
   store the data object in the selected memory unit in response thereto.

2. The apparatus of claim 1, wherein at least one of the memory units is addressable at an individual bit level.

3. The apparatus of claim 1, wherein the workload indicator comprises a randomness measure of the data object, wherein objects having relatively higher randomness correspond to the memory units having relatively smaller minimum addressable data unit sizes.

4. The apparatus of claim 1, wherein the workload indicator comprises a level and/or frequency of recent activity related to the data object, wherein objects having relatively higher levels and/or frequency of recent activity correspond to the memory units having relatively smaller minimum addressable data unit sizes.

5. The apparatus of claim 1, wherein the host interface provides access to logical blocks of a uniform logical block size, wherein at least one of the different minimum addressable data unit sizes is smaller than the uniform logical block size.

6. The apparatus of claim 1, wherein the two or more memory units have at least one other different characteristic that includes any combination of throughput metric, latency metric, and space available metric, and, wherein the composite characteristic is further based on the at least one other different characteristic.

7. The apparatus of claim 6, wherein the space available metric dominates the composite characteristic when the space available of at least one of the memory units reaches a threshold value.

8. The apparatus of claim 1, wherein at least one of the memory units comprises a resistive memory unit.

9. The apparatus of claim 1, wherein the controller is further configured to:

determine whether a second data object is temporally related to the first data object;

if it is determined that the second data object is temporally related to the first data object, store the second data object in the selected memory unit to cause the second data object to have spatial locality with the first data object; and if it is determined that the second data object is not temporally related to the first data object, select one of the memory units to store the second data object based on a workload indicator of the second data object.

10. The apparatus of claim 9, wherein the second data object is stored in the selected memory unit if it is determined that the data object is both temporally and spatially related to the first data object.

11. A method, comprising:

determining a workload indicator of a data object that is a subject of a host command;

selecting a memory unit of two or more non-hierarchical, non-volatile memory units having composite characteristics based on different minimum addressable data unit sizes and endurance metrics, in response to the workload indicator of the data object corresponding the composite characteristics of the selected memory unit corresponding to the workload indicator, the two or more memory units comprising a first unit of flash memory and a second unit of non-flash memory, wherein the endurance metrics dominate the composite characteristics when an endurance of at least one of the two or more memory units reaches a threshold value; and storing the data object in the selected memory unit in response thereto.

12. The method of claim 11, wherein at least one of the memory units is addressable at an individual bit level.

13. The method of claim 11, wherein the workload indicator comprises a level and/or frequency of recent activity related to the data object, wherein objects having relatively higher levels and/or frequency of recent activity correspond to the memory units having relatively smaller minimum addressable data unit sizes.

14. The method of claim 11, wherein the workload indicator comprises a randomness measure of the data object, wherein objects having relatively higher randomness correspond to the memory units having relatively smaller minimum addressable data unit sizes.

15. The method of claim 11, wherein the workload indicator comprises a temporal locality metric.

16. The method of claim 11, wherein the two or more memory units have at least one other different characteristic that includes any combination of throughput metric, latency metric, and space available metric, and, wherein the composite characteristic is further based on the at least one other different characteristic.

17. The method of claim 16, wherein the space available metric dominates the composite characteristic when the space available of at least one of the memory units reaches a threshold value.

18. The method of claim 11, further comprising:

determining whether a second data object is temporally related to the first data object;

if it is determined that the second data object is temporally related to the first data object, storing the second data object in the selected memory unit to cause the second data object to have spatial locality with the first data object; and if it is determined that the second data object is not temporally related to the first data object, selecting one of the memory units to store the second data object based on a workload indicator of the second data object.

19. A non-transitory computer readable medium storing instructions that are operable by a processor to perform the method of claim 1.

20. A system comprising:

two or more non-hierarchical, non-volatile memory units having composite characteristics based on different minimum addressable data unit sizes and endurance metrics, the two or more memory units comprising a first unit of flash memory and a second unit of non-flash memory;

means for determining a workload indicator of a data object that is a subject of a host command;

means for selecting a memory unit of the two or more memory units in response to the workload indicator of the data object corresponding to the composite characteristics of the selected memory unit corresponding to the workload indicator, wherein the endurance metrics dominate the composite characteristics when an endurance of at least one of the two or more memory units reaches a threshold value; and means for storing the data object in the selected memory unit in response thereto.

* * * * *